FIG.2
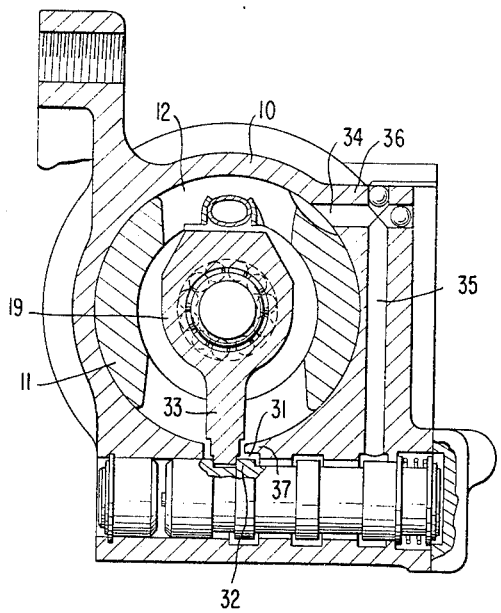
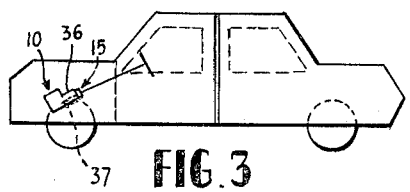
FIG.3
INVENTORS
HANS-JOACHIM M. FÖRSTER
KLAUS KATZ
EGON BAUER
BY Dicke + Craig
ATTORNEYS United States Patent Office 3,489,065
Patented Jan. 13, 1970

1

3,489,065
STEERING GEAR FOR MOTOR VEHICLES
Hans-Joachim M. Forster, Stuttgart-Riedenber, Klaus Katz, Stuttgart, and Egon Bauer, Goppingen, Germany, assignors to Daimler-Benz Aktiengesellschaft, Stuttgart-Unterturkheim, Germany
Filed Mar. 21, 1967, Ser. No. 624,837
Claims priority, application Germany, Mar. 24, 1966, D 49,683
Int. Cl. F15b 21/04
U.S. Cl. 92—79    7 Claims

ABSTRACT OF THE DISCLOSURE

A steering gear for a motor vehicle, especially a servo-steering gear mechanism, which comprises a steering spindle connected with a working piston slidingly accommodated within the working space of a hydraulic cylinder, the working piston being connected with a steering shaft forming the output of the steering gear, and a discharge connection for the hydraulic medium arranged within the working space of the hydraulic cylinder along an upper wall portion in relation to the force of gravity. The connection with the pressure source for the hydraulic medium can be located in the working space at a place as far away as possible from the corresponding discharge connection.

BACKGROUND OF THE INVENTION

Figure 1:
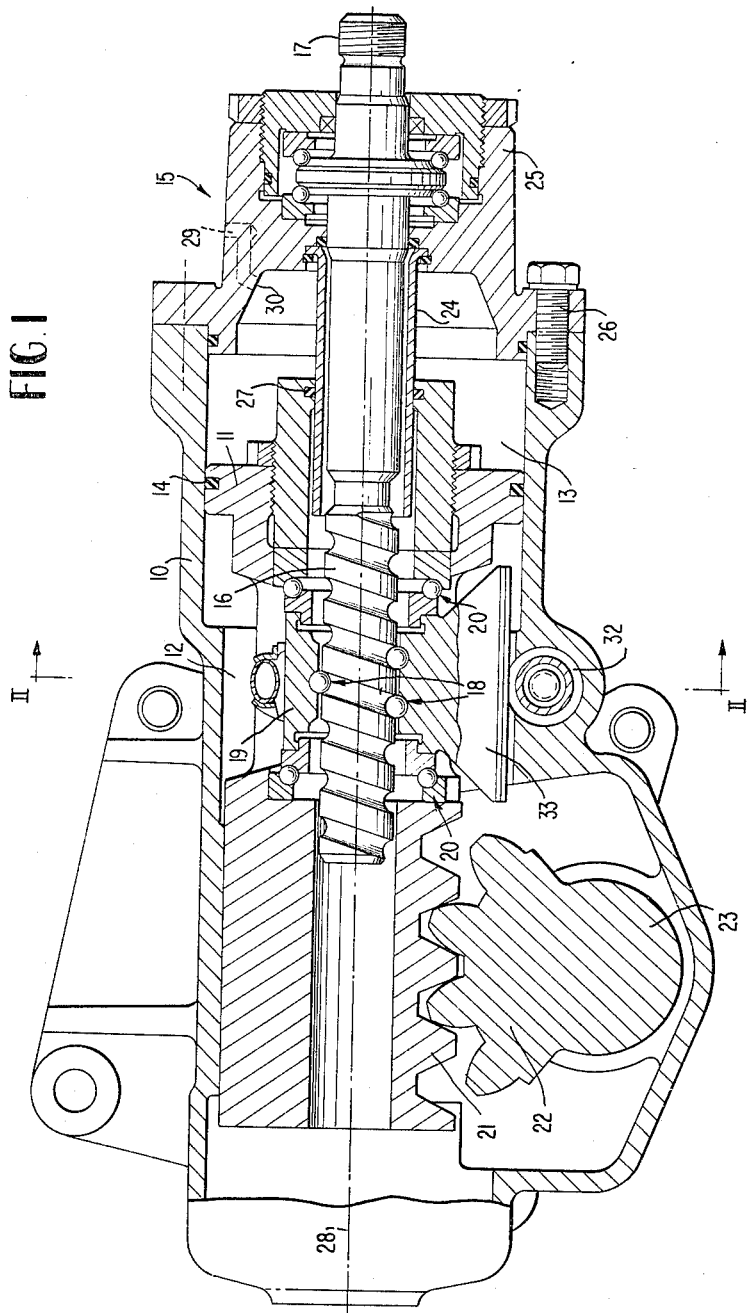

The present invention relates to a steering gear for motor vehicles, especially with power steering, in which a gear part on the output side is in driving connection with the working piston of a hydraulic cylinder.

SUMMARY OF THE INVENTION

The purpose underlying the present invention essentially consists in simplifying and improving such a steering gear. For this purpose, provision is made according to the present invention that the discharge connection is arranged in at least one working space of the hydraulic cylinder along an upper wall portion in relation to the force of gravity. The advantage is achieved by the present invention that the spaces of the steering gear for the pressure medium are vented automatically. The air contained in the hydraulic pressure medium collects at the highest place of the respective working space and is conducted under the additional influence of the stroke movements of the working piston by way of the discharge connection and the return line of the pressure medium to the pressure medium tank. The air can escape from the latter into the free atmosphere.

According to a further feature of the present invention, the connection for the pressure source in at least one working space can be arranged as far away as possible from the corresponding discharge connection. The relatively large space as well as more time during the pressure medium circulation is available in that case for the separation of the air contained in the hydraulic medium so that the automatic venting of the hydraulic cylinder is improved advantageously. A further advantage of the present invention resides in that the realization of the automatic venting is made possible practically without any technical expenditures and the special, separate venting installations necessary heretofore can be dispensed with.

The present invention has particular significance for the series production of steering gears. With such a type of manufacture, separate means and lengthy machining operations were required heretofore for the venting system of the hydraulic spaces. This is also true for the servicing of such types of steering gears. The aforementioned disadvantages are avoided by the present invention.

Accordingly, it is an object of the present invention to provide a steering gear for motor vehicles which is simple in construction and eliminates by simple means the aforementioned shortcomings and drawbacks encountered with the prior art constructions.

Another object of the present invention resides in a steering gear for motor vehicles, especially a steering gear for use with power steering systems which is characterized by greater simplicity and improved performance.

Another object of the present invention resides in a servo-steering gear of the type described above which eliminates time-consuming and costly operations to assure appropriate venting of the hydraulic cylinder.

These and further objects, features, and advantages of the present invention will become more obvious from the following description when taken in connection with the accompanying drawing which shows, for purposes of illustration only, one embodiment in accordance with the present invention, and wherein:

FIGURE 1 is a partial longitudinal cross-sectional view through a steering gear of the servo-steering mechanism according to the present invention, FIGURE 2 is a partial cross-sectional view taken along line II—II of FIGURE 1, and FIGURE 3 is a schematic side elevational view of a motor vehicle illustrating schematically the conventional position of the steering gear in a motor vehicle.

Referring now to the drawing wherein like reference numerals are used throughout the two views to designate like parts, the housing 10 of the steering gear forms a hydraulic cylinder which is subdivided by the working piston 11 into the working spaces 12 and 13. The working piston 11 is sealed with respect to the housing 10 by means of a seal 14. The housing 10 can be closed in a pressure-tight and fluid-tight manner by a bearing cover arrangement generally designated by reference numeral 15 in which a steering worm 16 is rotationally but axially non-displaceably supported. The steering worm 16 has an outer spindle part 17 which can be connected for rotation in unison with the steering wheel of the motor vehicle. The steering worm 16 is in operative engagement by means of a conventional ball circulation system 18 with a steering nut 19 which is rotatably but axially immovably connected with the working piston 11 by way of inclined ball bearings generally designated by reference numeral 20. The steering nut 19 can carry out limited angular movements with respect to the housing in relation to its axis limited by appropriate abutments. These angular movements of the steering nut 19 may be utilized for the control of the hydraulic pressure medium for the working piston 11 in any known manner.

The working piston 11 has a toothed rack profile 21 into which engages the toothed segment 22 of a steering shaft 23. The steering shaft 23 forms the driven or output member of the steering gear and is rotatably supported in the housing 10 perpendicularly to the steering worm 16.

A guide bushing or sleeve 24 concentric to the steering worm 16 extends into the housing 10. The bushing or sleeve 24 may be constructed, for example, in one piece with the bearing cover part 25 which is connected to the housing 10 by screws 26. The guide sleeve 24 is sealed by means of the bearing cover arrangement 15 with respect to the steering worm 16 and by a seal 27 with respect to the working space 12.

In the installed position of the steering gear, the longitudinal axis 28 thereof is so inclined that the outer connecting piece 17 of the steering gear 16 assumes an upper position in relation to the force of gravity and the toothed rack part 21 of the working piston a lower position in relation to the force of gravity.

The pressure medium may be supplied to and removed from the working space 13, for example, by a channel indicated at 29. The orifice 30 of the channel 29 in the working space 13 is arranged in relation to the force of gravity along or in the uppermost wall portion of the working space 13. This uppermost wall portion is constituted in the embodiment illustrated in the drawing by the bearing cover part 25. The pressure medium may be supplied to the working space 12 by way of a pressure medium connection 31 (FIGURE 2). The pressure medium connection 31 is conventionally controlled by a control slide valve 32 which is actuated by a fixed arm 33 of the steering nut 19. The working space 12 includes a discharge connection 34 in which terminates a return channel 35. The return channel 35 is also controlled by the control slide member 32 and may be in communication thereby with a pressure medium tank. Since the hydraulic system including operation of the control valve forms no part of the present invention and may be of any conventional, known type, a detailed description thereof is dispensed with herein.

In relation to the force of gravity, the discharge connection 34 is arranged in an upper wall portion 36 and the connection 31 for the pressure medium source in a lower wall portion 37 of the working space 12 or housing 10. The normal position of the steering gear wall portions 36 and 37 of a steering gear is schematically indicated in FIGURE 3 in which, for the sake of clarity, the steering gear is shown larger than its actual size in relation to the vehicle. As is conventional, the longitudinal axis coinciding with the axis of the steering wheel is thereby inclined upwardly for the steering spindle to extend within the area of the driver compartment where the steering wheel is fastened in a conventional manner. It is achieved by this arrangement that the air enclosed in the pressure medium collects in the the area of the upper discharge connection 34 by reason of the smaller specific weight and is conveyed by means of the pressure medium flowing off by way of the channel 35 into the pressure medium tank (not shown) from which the air can escape into the atmosphere. As a result of the relatively large space between the lower pressure medium connection 31 and the upper discharge connection 34, the separation of the air in the working space 12 and therewith the venting thereof is particularly favored, especially with a pressure medium circulation between these connections.

While we have shown and described one embodiment in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are within the scope of those persons skilled in the art.

We claim:

1. A steering gear for vehicles, especially with servo-assist, in which an output gear part of the steering gear is operatively connected with a working piston of a hydraulic cylinder, wherein the improvement comprises discharge connection means for the hydraulic medium, said hydraulic cylinder being subdivided by said working piston into two working spaces, said discharge connection means being located in at least one working space of the hydraulic cylinder within an upper wall portion thereof in relation to the force of gravity with the steering gear and the hydraulic cylinder thereof in the normal position as installed in a vehicle, and further connection means for a pressure source, said further connection means being arranged in at least one working space and being arranged as far away as possible from the corresponding discharge connection means.

2. A steering gear according to claim 1, wherein the connection means for the pressure source is arranged in at least one working space below the corresponding discharge connection means in relation to the force of gravity.

3. A steering gear for vehicles, especially with servo-assist, in which an output gear part of the steering gear is operatively connected with a working piston of a hydraulic cylinder, wherein the improvement comprises discharge connection means for the hydraulic medium, said hydraulic cylinder being subdivided by said working piston into two working spaces, said discharge connection means being located in at least one working space of the hydraulic cylinder within an upper wall portion thereof in relation to the force of gravity with the steering gear and the hydraulic cylinder thereof in normal position as installed in a vehicle, and connection means for a pressure source arranged in at least one working space below the corresponding discharge connection means in relation to the force of gravity.

4. A steering gear for vehicles, especially with servo-assist, in which an output gear part of the steering gear is operatively connected with a working piston of a hydraulic cylinder, wherein the improvement comprises discharge connection means for the hydraulic medium, said hydraulic cylinder being subdivided by said working piston into two working spaces, each working space of the hydraulic cylinder being provided with discharge connection means located within an upper wall portion of the hydraulic cylinder in relation to the force of gravity with the steering gear and the hydraulic cylinder thereof in the normal position as installed in a vehicle, and connection means providing a connection with a pressure source in at least one working space, the last-mentioned connection means for the pressure source being located in the respective working space below the corresponding discharge connection means in relation to the force of gravity with the steering gear and the hydraulic cylinder thereof in the normal position as installed in the vehicle.

5. A steering gear according to claim 4, wherein the discharge connection means and the pressure source connection means of the last-mentioned working space are so spaced from each other that a relatively large space remains therebetween favoring the venting.

6. A steering gear for vehicles, especially with servo-assist, in which an output gear part of the steering gear is operatively connected with a working piston of a hydraulic cylinder, wherein the improvement comprises discharge connection means for the hydraulic medium, said hydraulic cylinder being subdivided by said working piston into two working spaces, said discharge connection means being located in at least one working space of the hydraulic cylinder within an upper wall portion thereof in relation to the force of gravity with the steering gear and the hydraulic cylinder thereof in the normal position as installed in a vehicle, said one working space being also provided with a connection means for a pressure medium which is arranged below the corresponding discharge connection means in relation to the force of gravity with the steering gear and the hydraulic cylinder thereof in the normal position as installed in the vehicle.

7. A steering gear according to claim 6, wherein said discharge connection means and the connection means for the pressure medium are located at approximately opposite sides of said one working space so as to leave a relatively large space therebetween favoring venting of the pressure medium.

References Cited

UNITED STATES PATENTS

| | | | |
|---|---|---|---|
| 2,334,347 | 11/1943 | McMurtry | 180—79.2 |
| 2,362,930 | 11/1944 | Robbins | 180—79.2 |
| 2,457,750 | 12/1948 | Thomas | 180—79.2 |
| 888,481 | 5/1908 | Fritsch | 92—138 |
| 2,192,175 | 3/1940 | Ballard | 92—138 |
| 2,830,461 | 4/1958 | Sheppard | 92—138 |
| 3,010,335 | 11/1961 | Foerster et al. | 91—380 |
| 3,292,499 | 12/1966 | Duffy | 91—368 |

PAUL E. MASLOUSKY, Primary Examiner

U.S. Cl. X.R.

91—466